United States Patent [19]
Wertheim

[11] Patent Number: 5,775,854
[45] Date of Patent: Jul. 7, 1998

[54] METAL CUTTING TOOL

[75] Inventor: Rafael Wertheim, Qiryat Bialik, Israel

[73] Assignee: Iscar Ltd., Migdal Tefen, Israel

[21] Appl. No.: 685,754

[22] Filed: Jul. 24, 1996

Related U.S. Application Data

[63] Continuation of Ser. No. 268,379, Jun. 29, 1994, abandoned, which is a continuation-in-part of Ser. No. 224,174, Apr. 7, 1994, Pat. No. 5,439,327, which is a continuation of Ser. No. 948,197, Sep. 18, 1992, abandoned.

[30] Foreign Application Priority Data

Sep. 27, 1991 [IL] Israel ............................ 99584
Jul. 30, 1993 [IL] Israel ........................... 106537

[51] Int. Cl.⁶ ...................................... B23P 15/28
[52] U.S. Cl. ................. 407/11; 407/113; 407/117; 82/50
[58] Field of Search ................ 407/11, 113, 117; 82/50; 408/56

[56] References Cited

U.S. PATENT DOCUMENTS

| 3,798,725 | 3/1974 | Hanson ............................ 407/11 |
| 5,439,327 | 8/1995 | Wertheim ........................ 407/11 |

FOREIGN PATENT DOCUMENTS

| 0 100 376 | 2/1984 | European Pat. Off. . |
| 0 507 250 | 10/1992 | European Pat. Off. . |
| 0 534 450 | 3/1993 | European Pat. Off. . |
| 1229583 | 9/1960 | France . |
| U 1708871 | 6/1955 | Germany . |
| 3004166 | 8/1980 | Germany . |
| 3033626 | 4/1982 | Germany . |
| 59-73257 | 4/1984 | Japan .......................... 407/11 |

*Primary Examiner*—S. Thomas Hughes
*Attorney, Agent, or Firm*—Pennie & Edmonds LLP

[57] ABSTRACT

A metal cutting tool comprising a cutting insert and a cutting insert holder is described. The insert has a body portion and a head portion. The head portion has an upper rake surface, a front relief flank surface, and a cutting edge defined between the first two. The holder is formed with a pair of jaws which clamp the insert. The first jaw abuts an upper surface of the insert adjacent the rake surface while the second jaw abuts a lower surface of the insert, adjacent to a base edge of the relief flank surface. A portion of this second jaw extends beyond the base edge, forming a projection. The holder is provided with a coolant flow channel having an input adapted to be coupled to a coolant source. A downstream portion of the channel terminates in a coolant flow outlet formed in the projection. The downstream portion and the outlet are arranged such that a coolant outflow from the outlet is directed substantially parallel to the relief surface.

16 Claims, 6 Drawing Sheets

5,775,854

METAL CUTTING TOOL

This is a continuation of application Ser. No. 08/268,379, filed Jun. 29, 1994, now abandoned, which is a continuation-in-part of U.S. application Ser. No. 08/224,174, filed Apr. 7, 1994, now U.S. Pat. No. 5,439,327, which is a continuation of Ser. No. 07/948,197, filed Sep. 18, 1992, now abandoned.

FIELD OF THE INVENTION

This invention relates to a metal cutting tool of the kind having an exchangeable metal cutting insert releasably retained in an insert holder of the tool.

BACKGROUND OF THE INVENTION

With such metal cutting tools, the cutting edge of the insert is defined between a rake surface thereof and a relief flank or clearance face and, in use, the cutting edge and the portion of the relief flank adjacent thereto, become rapidly worn and the insert must therefore be frequently replaced or reversed so as to index a fresh cutting edge in position.

Wear of the relief flank starts at the cutting edge itself and progressively extends downwardly in the direction of the base of the cutting insert. It is known that once the extent or depth of the worn region, as measured from the cutting edge, exceeds a certain magnitude, the continued use of that existing edge of the cutting tip deleteriously affects the cutting operation. As a consequence, cutting insert manufacturers specify for each particular type of cutting insert a prescribed maximum depth of flank wear (generally referred to as $VB_{max}$) after which the cutting insert should be replaced or indexed.

It is well-known that one of the factors which influences flank wear is the hardness of the insert material. Thus, the harder the material the less will be the rate of wear and the longer the cutting insert can be used before wear has reached $VB_{max}$ requiring replacement. However, this hardness is directly related to the working temperature and with rise of working temperature there is an associated reduction in hardness, with a consequent increase in the rate of wear.

It is for this reason that, in the use of such cutting tools, means have been provided for the fluid cooling of the cutting insert in the region of the cutting edge thereof.

In one known method of fluid cooling, the upper surface of the cutting insert is sprayed with a coolant fluid but it is found that the continued movement of the chip over the rake surface of the cutting insert disturbs the effective cooling of the insert by the coolant.

In another known method of cooling, a coolant is passed through the cutting insert from the base thereof to the upper rake surface. It is found in practice, however, that the pressure of the chip on the upper rake surface prevents the coolant from effectively reaching the region of the cutting edge, and here again the efficiency of cooling is limited.

A further method which has been employed has been to direct a coolant through a duct formed in the cutting insert or cutting tip, which duct emerges from an aperture in the relief flank of the cutting insert. It is found, however, that in order to ensure effective distribution of the coolant liquid around the relief flank and in the vicinity of the cutting edge, a number of such coolant ducts must be provided and this, in turn, leads to a significant weakening of the cutting insert. Furthermore, the penetration of the coolant is hindered by the narrow gap between the relief flank and the workpiece.

It has also been proposed to direct a jet of a coolant liquid into the space between the relief flank and the workpiece, but this method is of very limited value, particularly when the tool involved is a grooving or parting tool, seeing that the region between the relief flank and the workpiece is of extremely limited accessibility as compared with a turning tool.

With a view to overcoming some of these disadvantages, it has been proposed in our prior co-pending patent application Ser. No. 99,584 (corresponding to published European Patent Application No. 92 116426.5), hereinafter "our prior application", to provide a metal cutting tool having a metal cutting insert with at least one cutting edge defined between a rake face and a relief flank and at least one recess formed in the relief flank and constituting a coolant channel extending towards said cutting edge and being spaced therefrom by a spacing which is not less than a prescribed permissible depth of flank wear $VB_{max}$ of the cutting insert.

With such a cutting tool, coolant is directed into the coolant channel formed in the relief flank of the insert and is thus guided to and concentrated in the region of expected flank wear. Thus, cooling takes place in the region of the cutting insert where it is most required and, in this way, the rate of flank wear is significantly reduced. This, in turn, reduces the frequency with which cutting inserts have to be replaced when the wear thereof has reached the maximum permissible level.

In one particular embodiment in accordance with our prior application, the recess extends from and through the base of the insert and communicate with the outlet of a fluid coolant duct formed in the insert holder.

It will be realized, however, that this proposal in accordance with our prior application involves the use of a special cutting insert in which is formed the required recess in the relief flank, this in addition to the provision of an insert holder formed with the required coolant duct.

It is an object of the present invention to provide a new and improved cutting tool which incorporates a standard cutting insert but wherein the relief flank is subjected to effective cooling.

BRIEF SUMMARY OF THE INVENTION

According to the present invention, there is provided a metal cutting tool comprising an exchangeable cutting insert having a body portion and a cutting head portion; said cutting head portion comprising an upper rake surface and a front relief flank surface, defining between them a cutting edge; and a cutting insert holder formed with a pair of clamping jaws releasably clamping said insert in said holder, a first of said clamping jaws being located adjacent said rake surface, a second of said clamping jaws being located adjacent a base edge of said relief flank surface, a projecting portion of said second clamping jaw extending beyond said base edge; a coolant flow channel formed in said holder having an inlet adapted to be coupled to a coolant flow supply; a downstream portion of said channel having an outlet formed in said projecting portion and being so formed that a coolant outflow from said outlet is directed substantially parallel to said relief surface.

Preferably, the cutting tool is a parting or cut-off tool whilst the cutting insert is formed with a wedge-shaped body portion which is wedge clamped within a correspondingly wedge-shaped recess defined by the clamping jaws of the insert holder.

The coolant emerging from the outlet formed in the insert holder is directed along the face of the relief flank reaching the cutting edge of the insert and the adjacent region of the workpiece. In this way, effective cooling of the sensitive region at and near the cutting edge is effected without the necessity of using specially designed cutting inserts.

BRIEF DESCRIPTION OF THE DRAWINGS

Various embodiments of metal cutting tools in accordance with the present invention will now be described by way of example and with reference to the accompanying drawings, in which.

DETAILED DESCRIPTION OF PREFERRED EMBODIMENTS

Figure 1:
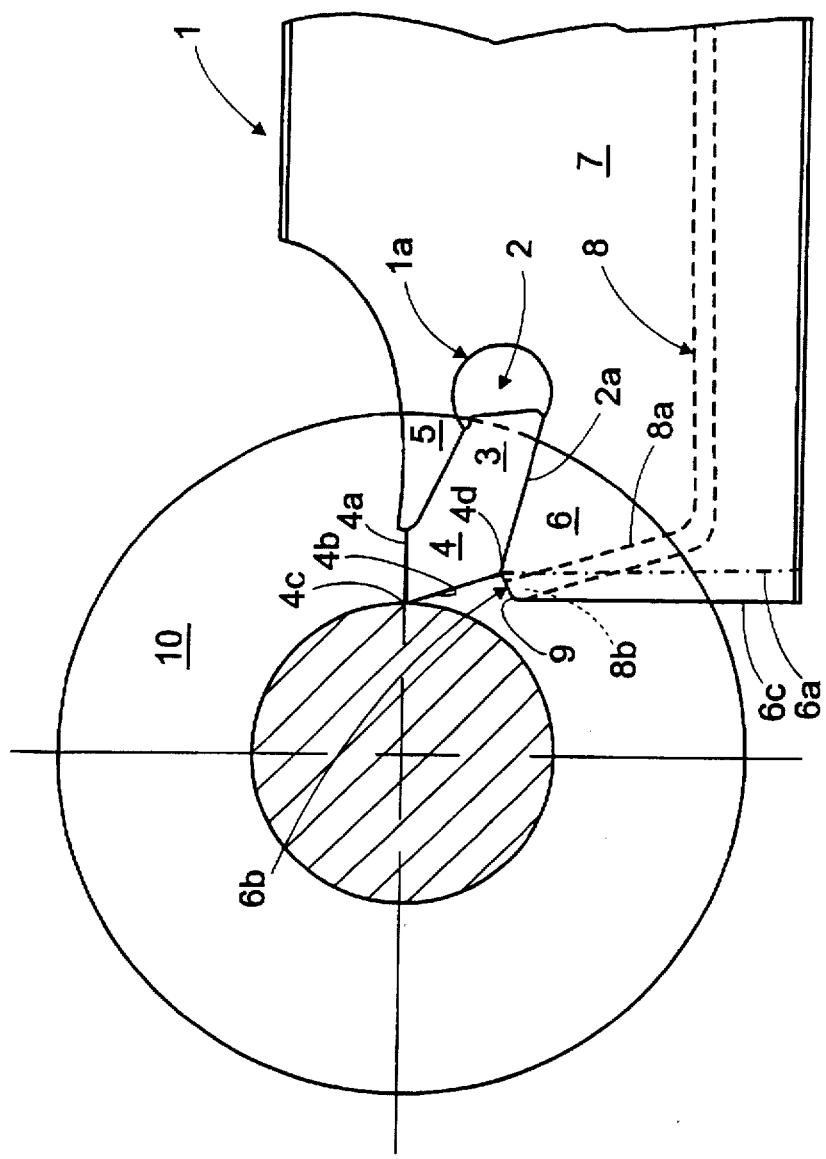
FIG. 1 is a side elevation of a portion of one form of cutting tool in accordance with the present invention, juxtaposed with reference to workpiece.
Figure 2:
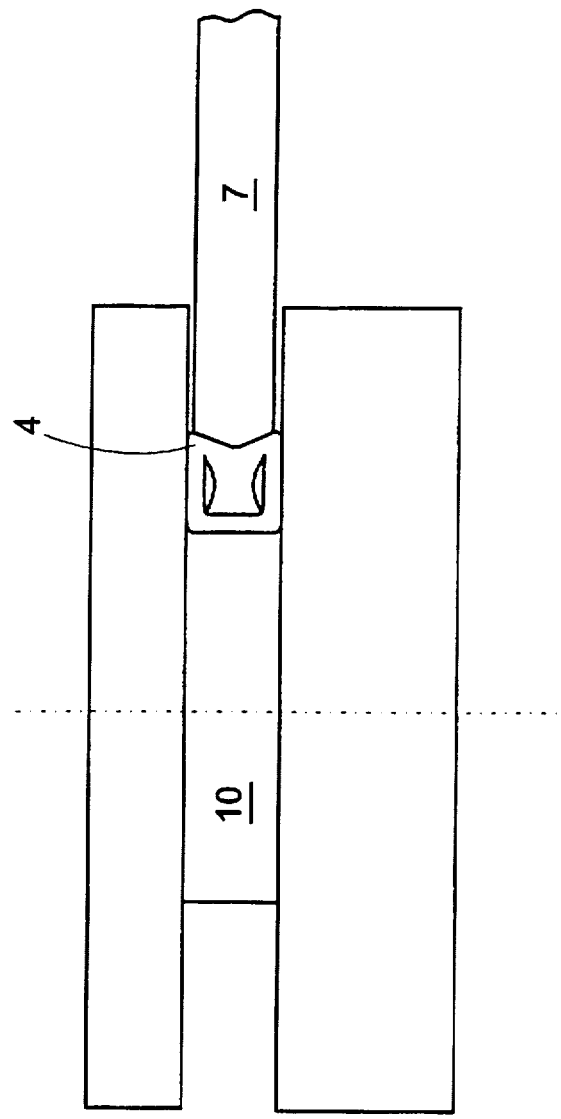
FIG. 2 is a plan view from above of the cutting tool and workpiece shown in FIG. 1.

As seen in FIGS. 1 and 2 of the drawings, a cutting tool (1), which is here shown in a parting operation, comprises a cutting insert (2) having a wedge-shaped body portion (3) and a cutting head portion (4). The cutting insert (2) is clampingly retained between upper and lower clamping jaws (5, 6) of a cutting insert holder (7), with the upper surface of the clamping jaw 6 being co-directional with the base (2a) of the body portion (3) of the cutting insert (2). These clamping jaws (5, 6) define between them a wedge-shaped recess within which is wedge clamped the body portion of the cutting insert (2). The cutting insert (2) shown by way of example is sold under the trademark SELF-GRIP™ and is of the GFN type manufactured by Iscar, Ltd. The insert holder (7) is also of the same general type of insert holder used with SELF-GRIP™ tools but is distinguished therefrom in that there is formed integral with the lower jaw (6) a projecting portion (6a) which, as can be seen, extends beyond the base (2a) of the insert (2). As seen in FIG. 1, the projecting portion (6a) of the lower jaw (6) has an upper surface portion (6b) constituted by the extension of the upper surface of the lower jaw (6) and a front end surface (6c) oriented transversely thereto.

The cutting head portion (4) of the insert (2) is formed with an upper rake surface (4a) and a front relief flank surface (4b) which define between them a cutting edge (4c). The relief flank surface (4b) also includes a base edge (4d) defined at the intersection of the relief flank surface (4b) with the base (2a) of the insert (2).

As seen in FIG. 1, the surface portion (6b) of the projecting portion projects beyond this base edge (4d) of the relief flank surface (4b) of the insert (2) and is directed substantially transversely to the relief flank surface (4b). In particular, when bevelled as shown at (9) in FIG. 1, the surface portion (6b) of the projecting portion may be perpendicular to the front relief flank surface (4b) of the insert (2).

Formed in the insert holder (7) is an elongated coolant duct (8) having an inlet (not shown) adapted to be coupled to a coolant fluid source. A downstream portion (8a) of the coolant duct (8) is disposed substantially parallel to the relief flank surface (4b) of the cutting insert (2) and emerges from the insert holder (7) via an outlet (8b) formed in a bevelled portion (9) of the upper surface of the projecting portion (6a).

It will be readily seen that coolant fluid emerging from the coolant duct (8) is directed upwardly along the relief flank surface (4b) so as to reach the cutting edge (4c) and the adjacent portions of a workpiece (10). It will be readily seen from FIG. 1 of the drawings that, in effect, the cooling fluid is contained between the walls of the workpiece being parted and the relief flank surface (4b) of the cutting insert (2). In this way, it is ensured that the relief flank surface (4b) and, in particular, those portions thereof immediately adjacent the cutting edge (4c), are effectively cooled and in this way the wear rate of the cutting edge (4c) and the upper portion of the relief flank (4b) is considerably reduced.

Figure 3:
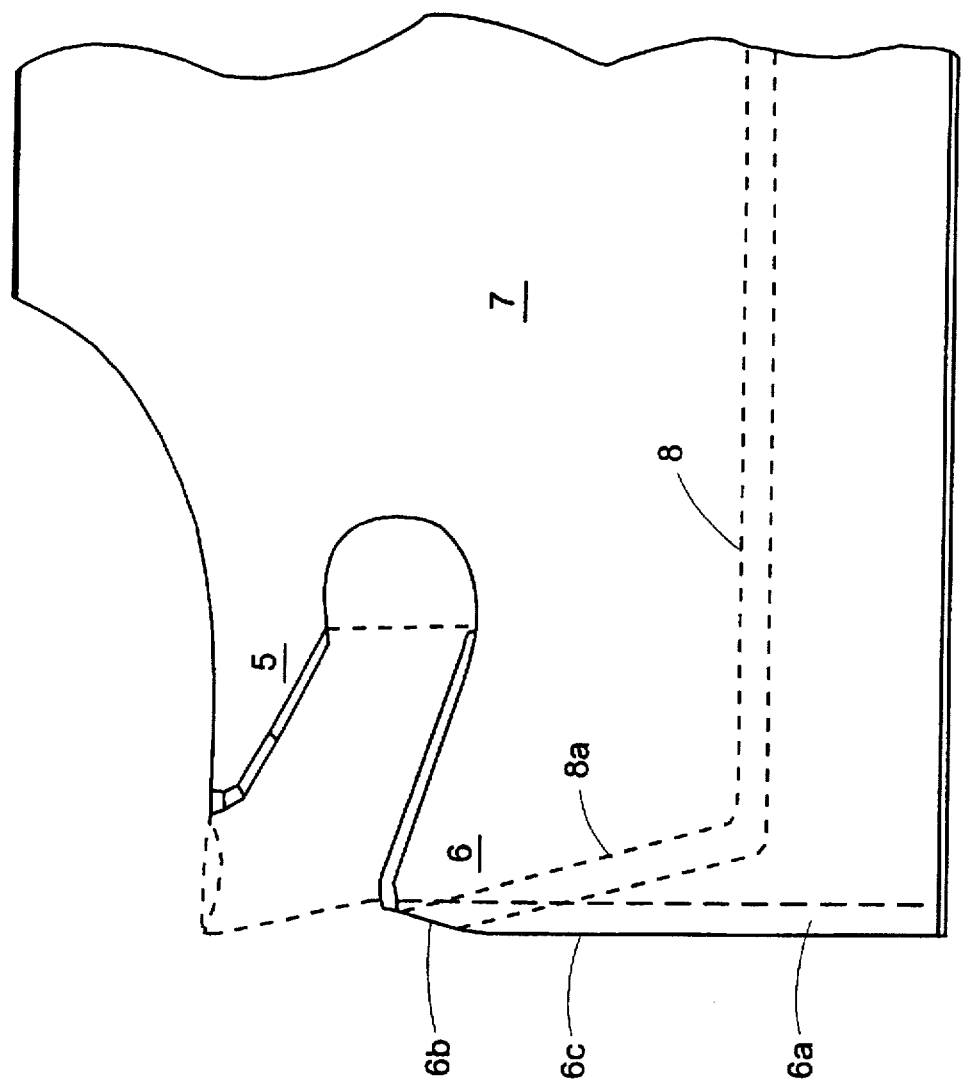
FIG. 3 is a side elevation of a portion of a cutting insert holder used in a further embodiment of a cutting tool in accordance with the present invention.

In a slightly modified embodiment shown in FIG. 3 of the drawings, the outlet of the coolant duct is formed in a bevelled portion (6b) of a front end surface (6c) of the projecting portion (6a) of the insert holder (7).

Figure 4:
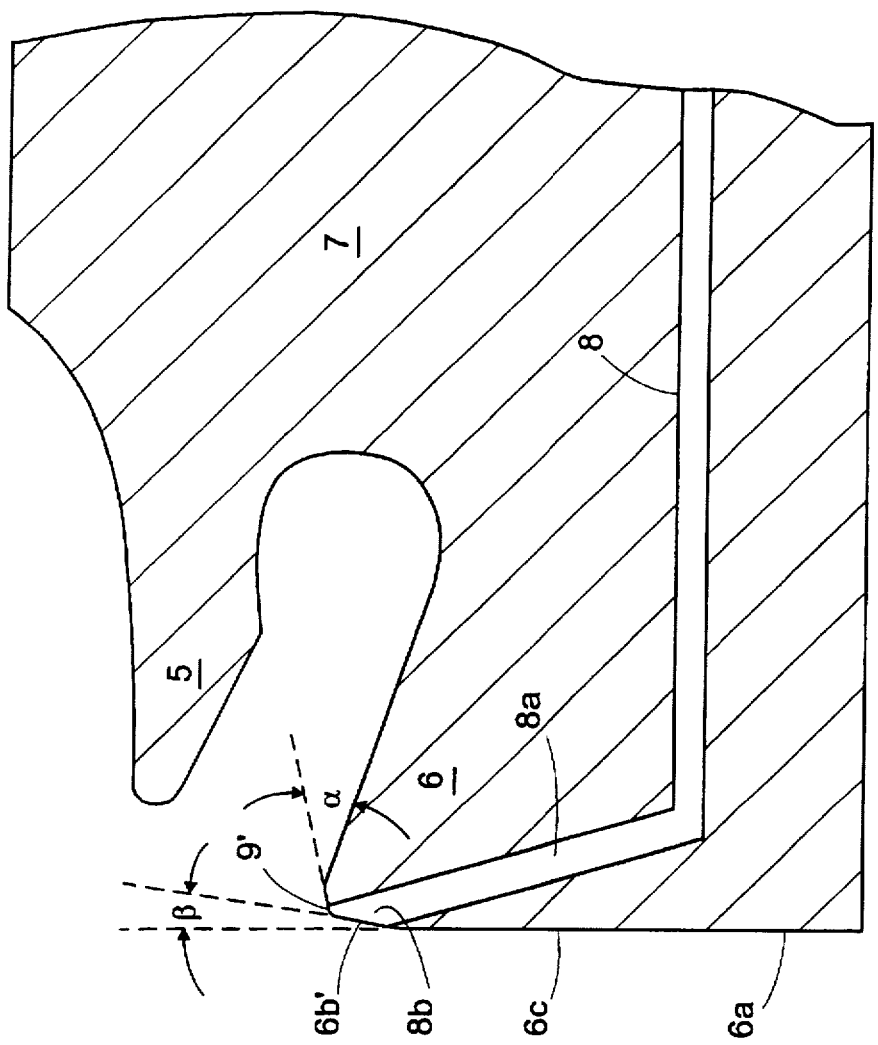
FIG. 4 is a longitudinally sectioned view of a portion of a cutting insert holder used in a still further embodiment of a cutting tool in accordance with the present invention.
Figure 5:
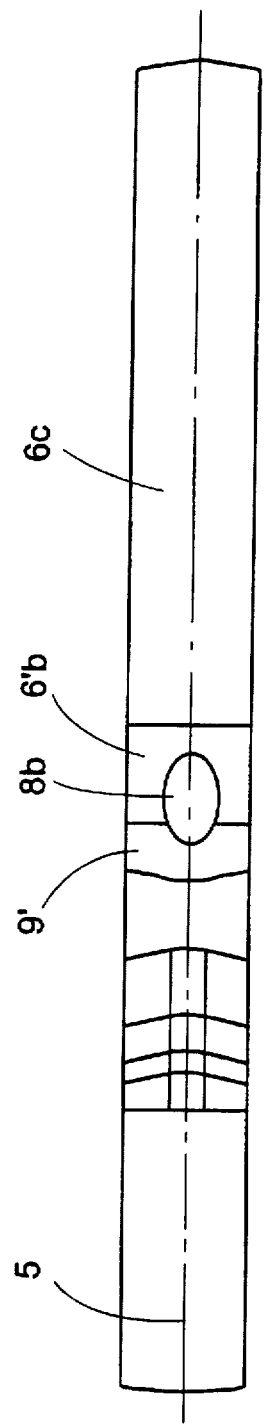
FIG. 5 is a front elevation of the cutting insert holder shown in FIG. 4.

In a still further modified embodiment shown in FIGS. 4 and 5 of the drawings, the outlet (8b) of the coolant duct extends to both an upper, bevelled portion (6b') of the front end of the projecting portion (6a) of the insert holder (7), as well as to the bevelled portion (9') of the upper surface of the projecting portion (6a).

In all the embodiments just described, the outlet of the coolant duct is to be found in bevelled portions of the upper regions of the projecting portion (6a) of the insert holder (7). The provision of such bevelling is advantageous as it reduces any limitation which may otherwise arise on the maximum diameters which can be grooved or parted as a consequence of the extension in the length of the insert holder. Furthermore, the provision of such bevelling is also advantageous in ensuring the effective direction of the coolant over the entire relief flank surface. It will be appreciated, however, that the provision of such bevelling does not constitute an essential element of the present invention.

Figure 6:
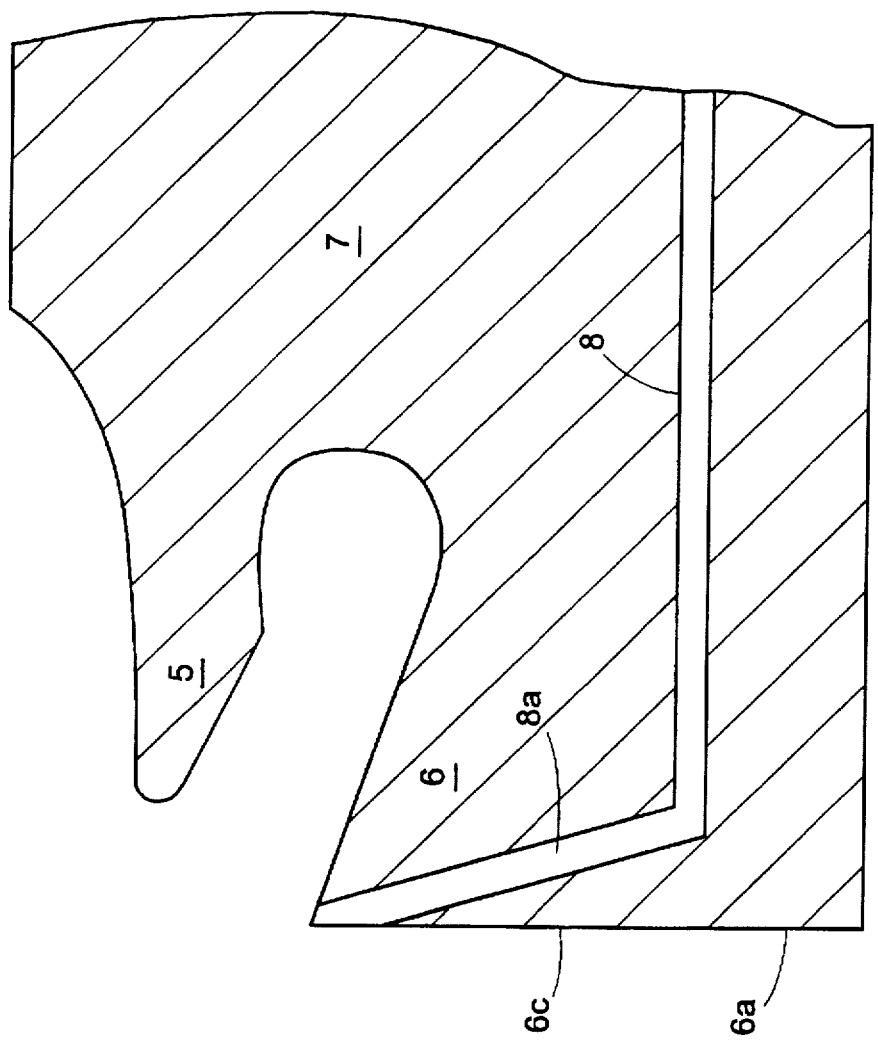
FIG. 6 is a view similar to FIG. 4 showing the embodiment of a cutting tool without any bevelled portion.

As shown in FIG. 4 of the drawings, the upper bevelled portion (6b') of the holder (7) defines an angle β with respect to the remainder of the front edge portion, whilst the bevelled portion (9') of the upper surface of the projecting portion (6a) defines an angle α with respect to the clamping surface itself. Angles α and β may range from 0° to 30° so that the bevelled portion 9' is oriented generally in the same direction as the clamping surface and the bevelled portion 6b' is oriented generally in the same direction as the remainder of the front edge portion. When, however, either of the angles equals 0°, the corresponding surface is not bevelled, as illustrated in FIG. 6.

Whilst the invention has been particularly described with reference to a wedge-clamped cutting insert, it will be readily appreciated that the invention can be equally well applied to cutting inserts which are clamped in a differing manner between respective clamping jaws.

I claim:

1. A metal cutting tool comprising an exchangeable cutting insert having a body portion and a cutting head portion; said cutting head portion comprising an upper rake surface and a front relief flank surface, defining between them a cutting edge; and a cutting insert holder formed with a pair of clamping jaws releasably clamping said insert in said holder, a first of said clamping jaws being located adjacent said rake surface, a second of said clamping jaws being located adjacent a base edge of said front relief flank surface, a projecting portion of said second clamping jaw extending beyond said base edge and having an upper surface extending beyond surface of said second clamping jaw abutting a base of said body portion and a front end surface oriented transversely to said upper surface of the projecting portion; a coolant flow channel formed in said holder having an inlet adapted to be coupled to a coolant flow supply; a downstream portion of said channel having an outlet formed in the upper surface of said projecting portion and being so formed that a coolant outflow from said outlet is directed substantially parallel to said front relief flank surface.

2. A metal cutting tool according to claim 1, wherein said downstream portion is directed substantially parallel to said relief flank surface.

3. A metal cutting tool according to claim 1 or 2, wherein said upper surface of said projecting portion defines an angle $\alpha$, $0° \leq \alpha \leq 30°$, with said surface of the second clamping jaw abutting a base of said body portion.

4. A metal cutting tool according to claim 3, wherein said outlet extends over the upper surface of the projecting portion and a bevelled portion formed on the front end surface of said projecting portion.

5. A metal cutting tool according to claim 1, wherein said body portion of said cutting insert is wedge-shaped and wherein said clamping jaws define a correspondingly wedge-shaped recess.

6. A metal cutting tool comprising an exchangeable cutting insert having a body portion and a cutting head portion; said cutting head portion comprising an upper rake surface and a substantially continuous front relief flank surface, defining between them a cutting edge; and a cutting insert holder formed with a pair of clamping jaws releasably clamping said insert in said holder, a first of said clamping jaws clampingly abutting an upper surface of said body portion, a second of said clamping jaws having a front end surface and an upper surface oriented transversely to said front end surface and clampingly abutting a base of said body portion, said upper surface of the second clamping jaw having a surface portion projecting beyond a base edge of the front relief flank surface of the insert; a coolant flow channel formed in said holder having an inlet adapted to be coupled to a coolant flow supply; a downstream portion of said channel having an outlet formed in said surface portion in an immediate vicinity of said base edge, and being so formed that a coolant outflow from said outlet is directed substantially parallel to said relief surface.

7. A metal cutting tool according to claim 6, wherein said surface portion defines an angle $\alpha$, $0° \leq \alpha \leq 30°$, with said second clamping jaw upper surface.

8. A metal cutting tool according to claim 6, further comprising a bevelled surface formed on said front end surface of said second clamping jaw, said outlet extending to said bevelled surface.

9. A metal cutting tool according to claim 6, wherein said body portion of said cutting insert is wedge-shaped and said clamping jaws define a correspondingly wedge-shaped recess.

10. A metal cutting tool comprising, in combination:

a cutting insert having
 a base,
 an upper rake surface,
 a substantially continuous front relief flank surface,
 a cutting edge defined between said upper rake surface and said front relief flank surface, and
 a base edge defined between said front relief flank surface and said base, and a cutting insert holder adapted to retain said insert, said holder having
 a front end surface;
 a clamping surface abutting said base and oriented transversely to said front end surface, a projecting portion of said clamping surface extending beyond said base edge, said projecting portion having an upper surface oriented at an angle $\alpha$, $0° \leq \alpha \leq 30°$, with respect to said clamping surface abutting said base;
 a coolant flow channel formed in said holder, said channel having a downstream portion, and
 a coolant flow channel outlet formed in said projecting portion of said clamping surface, said downstream portion and said channel outlet arranged such that a coolant outflow from said outlet is directed substantially parallel to said relief flank surface.

11. A metal cutting tool according to claim 10, further comprising a bevelled surface formed on said front end surface of said holder, said outlet extending to said bevelled surface.

12. A metal cutting tool according to claim 10, wherein said downstream portion of said channel is directed substantially parallel to said relief flank surface.

13. A metal cutting tool according to claim 10 wherein said outlet is formed in a bevelled surface on said projecting portion.

14. A metal cutting tool according to claim 13 wherein said bevelled surface extends substantially perpendicular to said relief flank surface.

15. A metal cutting tool according to claim 10, wherein the cutting insert has a body portion received in a cutting insert holder, said cutting insert holder comprising an upper and a lower clamping jaw.

16. A metal cutting tool according to claim 15, wherein said body portion of said cutting insert is wedge-shaped and wherein said clamping jaws define a correspondingly wedge-shaped recess.

* * * * *